K. MELNICK.
ANIMAL TRAP.
APPLICATION FILED JAN. 12, 1920.
1,397,440.
Patented Nov. 15, 1921.
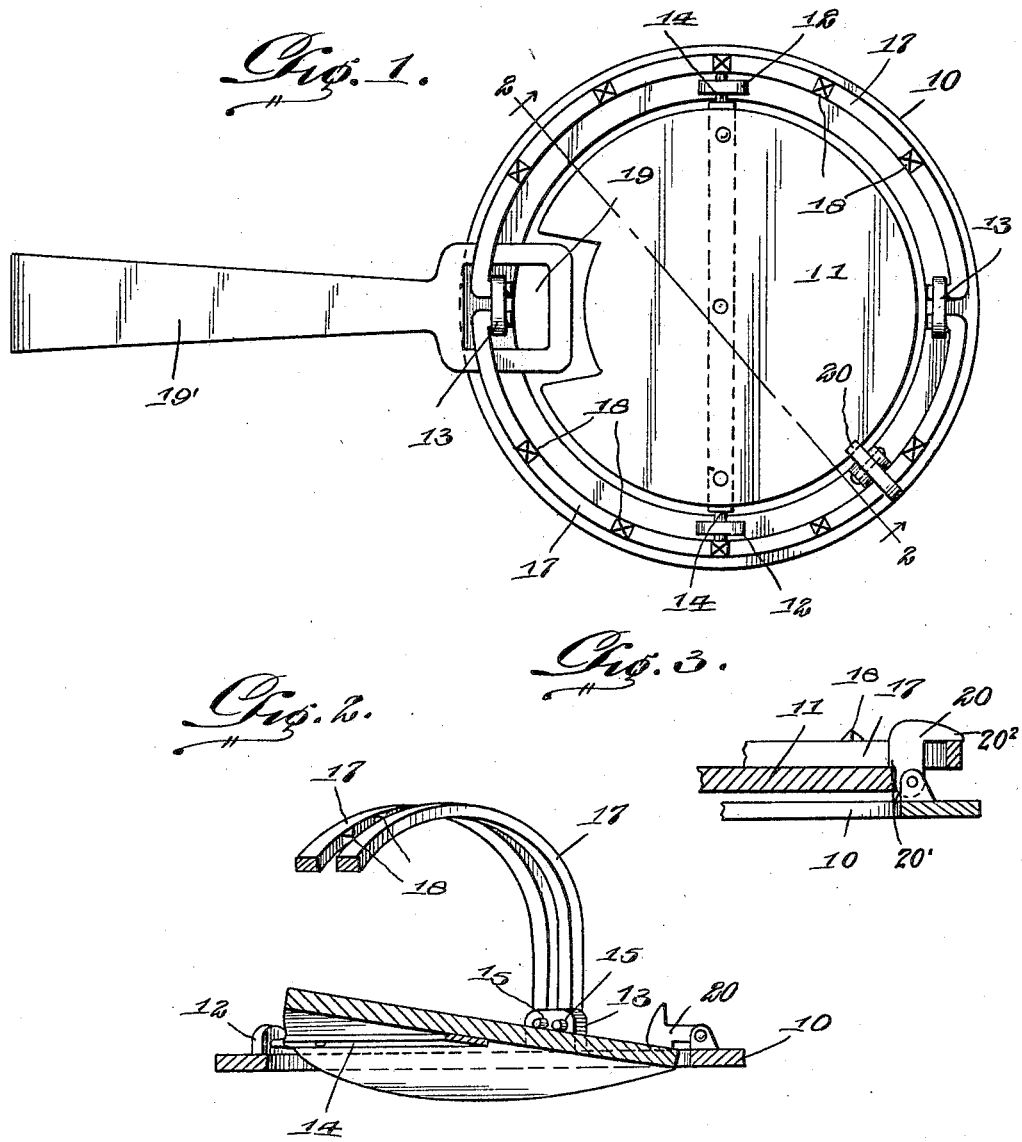

UNITED STATES PATENT OFFICE.

KARP MELNICK, OF PLANTSVILLE, CONNECTICUT.

ANIMAL-TRAP.

1,397,440.

Specification of Letters Patent.

Patented Nov. 15, 1921.

Application filed January 12, 1920. Serial No. 350,962.

*To all whom it may concern:*

Be it known that KARP MELNICK, a citizen of Russia, residing at Plantsville, in the county of Hartford and State of Connecticut, have invented new and useful Improvements in Animal-Traps, of which the following is a specification.

This invention comprehends the provision of an animal trap, including among other features, a pair of spring pressed pivoted jaws, and means of novel construction for holding the jaws open or shut rendering the trap extremely sensitive, to insure positive operation of the trap when the bait plate or holder is slightly depressed.

The nature and advantages of the invention will be better understood when the following detailed description is taken in connection with the accompanying drawings, the invention residing in the construction, combination and arrangement of parts as claimed.

In the drawing forming part of this specification, like numerals of reference indicate similar parts in the several views wherein:—

Figure 1 is a plan view of the trap showing the jaws in open position.

Fig. 2 is a sectional view taken on the line 2—2 of Fig. 1, showing the jaws in gripping relation.

Fig. 3 is a fragmentary view showing the jaws in set position.

The trap constructed in accordance with my invention comprises a circular base plate 10, having an enlarged central opening above which is arranged a bait holder 11. Rising from the base 10 at diametrically opposite points, are spaced pairs of lugs 12 and 13 respectively. The lugs of the pair 12 having openings to receive the shaft 14 which is secured to the underside of the bait holder, the shaft 14 being journaled in the lugs 12. The bait holder is preferably in the form of a disk, and the shaft 14 extends across the center of said disk and supports the latter for pivotal movement. The disk operates in the enlarged central opening of the base. Each of the lugs of the pair 13, is provided with spaced openings 15, and the corresponding opening of the respective lugs receives the opposite ends of one of the jaws 17. These jaws are of the usual construction and have their meeting edges serrated or toothed as at 18. A substantially U-shaped spring has one end secured to the base 10, and its opposite end provided with an enlarged opening 19 which receives the adjacent ends of said jaws, operating in the usual manner to throw the jaws into gripping relation, upon release of the jaws.

Pivoted upon a base 10 is a hook-like element 20 which is disposed to engage one of the jaws to hold the latter in an open position as shown in Fig. 1. This element is arranged immediately adjacent the periphery of the disk 12, and is adapted to be arranged in a vertical position when in use, to maintain the trap set, and is susceptible of gravitating to a substantially horizontal inactive position when released. The element 20 is formed to provide a shoulder 20' which projects from one side of the element, while the same element terminates to provide a right angularly disposed extension $20^2$ which projects from the opposite side of said element, the extension being arranged in a plane above the shoulder 20' when the element is in its vertical active position. Manifestly, the shoulder 20' engages the disk 11, while the extension $20^2$ holds the movable jaws in a set position. As shown in Fig. 1, the hook-like element 20 has its offset extremity overlying the adjacent jaw when the trap is set, the elements being maintained in this position by the disk or bait holder 11. However, when the bait holder is depressed under the weight of the animal, it assumes a position which allows the element 20 to gravitate to its inactive position releasing the jaw. The tendency of the jaw is to assume a gripping relation which will also assist in removing the element 20 out of engagement with the jaws, after which the spring 19' operates to throw the jaws effectively into gripping relation. The construction of the element 20 and its disposition with respect to the bait holder 11, is such that it renders the trap extremely sensitive, as the bait holder needs to be depressed but a slight distance in order to effect the release of the jaws, thus allowing the latter to be forcibly moved into gripping relation through the instrumentality of the spring 19'.

While it is believed that from the foregoing description, the nature and advantages of the invention will be aparent, I desire to have it understood that I do not limit myself in this connection and that such changes may be resorted to when desired as fall within the scope of what is claimed.

Having thus described my invention what I claim as new is:—

A trap comprising a base having a central opening, spaced pairs of diametrically opposed lugs rising from the base, a shaft journaled between one pair of lugs, a disk carried by said shaft and movable within the opening of the base, jaws pivoted between the other lugs, a spring having one end secured to the base and its opposite end associated with the jaws to forcibly move the latter into gripping relation, spaced lugs rising from the base, an elongated member pivoted between the latter mentioned lugs, a shoulder formed on one side of the elongated member, a right angularly disposed extension constituting the terminal of said member and projecting from the opposite side of said member, said member being disposed vertically in active position, and having its shoulder reposing upon said disk, said extension being arranged in a plane above said shoulder and adapted to overlie one of said jaws, whereby the said jaws are held in a set position.

In testimony whereof I affix my signature.

KARP MELNICK.